(12) United States Patent
Rahmer et al.

(10) Patent No.: US 8,319,830 B1
(45) Date of Patent: Nov. 27, 2012

(54) ICE FISHING CAMERA ADJUSTMENT GUIDE

(76) Inventors: Paul G. Rahmer, Fond du Lac, WI (US); Vall Iliev, Stow, OH (US)

( * ) Notice: Subject to any disclaimer, the term of this patent is extended or adjusted under 35 U.S.C. 154(b) by 434 days.

(21) Appl. No.: 12/575,525

(22) Filed: Oct. 8, 2009

Related U.S. Application Data (60) Provisional application No. 61/105,862, filed on Oct. 16, 2008.

(51) Int. Cl.
*H04N 9/47* (2006.01)
(52) U.S. Cl. .............................. 348/81; 348/61; 396/25
(58) Field of Classification Search ................... 348/25, 348/81, 61; 396/27, 419–421, 428, 25; 43/17
See application file for complete search history.

(56) References Cited

U.S. PATENT DOCUMENTS

| | | | |
|---|---|---|---|
| 3,065,666 A * | 11/1962 | Sampson | ......................... 396/27 |
| 4,823,494 A | 4/1989 | Waterman | |
| 4,964,430 A * | 10/1990 | Janis | ............................... 135/78 |
| 5,896,694 A * | 4/1999 | Midha | ............................... 43/17 |
| D429,744 S | 8/2000 | Zernov et al. | |
| D438,881 S | 3/2001 | Zernov | |
| 6,262,761 B1 | 7/2001 | Zernov et al. | |
| 6,476,853 B1 * | 11/2002 | Zernov et al. | ................... 348/81 |
| 6,724,986 B1 | 4/2004 | Sicher | |
| D489,387 S | 5/2004 | Zernov | |
| 6,836,993 B1 * | 1/2005 | Austin | ............................... 43/4 |
| 6,909,845 B1 | 6/2005 | Schillinger | |
| 7,620,303 B1 * | 11/2009 | Waddell et al. | ................. 396/25 |
| 2002/0196230 A1 | 12/2002 | Struyk | |
| 2003/0174206 A1 * | 9/2003 | Moroz | ........................... 348/81 |
| 2005/0185089 A1 * | 8/2005 | Chapman | ...................... 348/375 |
| 2009/0257741 A1 * | 10/2009 | Greb et al. | ...................... 396/55 |

* cited by examiner

*Primary Examiner* — Ramy M Osman
(74) *Attorney, Agent, or Firm* — John D. Gugliotta, Esq.; Nicholas A. Mihalic, Esq.; Howard L. Wernow (57) ABSTRACT

An ice fishing camera support device generally comprises a base portion that rotatably supports an indexed wheel. The support base generally comprises a circular top portion and downward-protruding side wall extending from the outer peripheral section of the top portion. A plurality of gripping teeth extend from the bottom surface of the side wall. The gripping teeth may be embedded into the ice surface to prevent the camera support device from sliding on the ice surface. The indexed wheel is centrally supported within the recessed section and may be freely rotated with respect to the support base. The support base and the indexed wheel comprise a slotted section which extends from their centers through their peripheral edges. An underwater camera cable is inserted into the slot, and the indexed wheel may be rotated with respect to the support base to precisely determine the angular orientation of the underwater camera.

9 Claims, 8 Drawing Sheets

ICE FISHING CAMERA ADJUSTMENT GUIDE

RELATED APPLICATIONS

The present invention claims benefit of U.S. Provisional Application 61/105,862 filed on Oct. 16, 2008 and incorporated by reference herein as if fully rewritten in its entirety.

BACKGROUND OF THE INVENTION

1. Field of the Invention

The present invention relates generally to camera support devices, and more specifically, to a camera support device capable of precise angular adjustment of an underwater camera used for ice fishing.

2. Description of the Related Art

Typically, underwater cameras for fishing applications are used for underwater surveillance of the terrain and wildlife. They typically consist of a submersible, waterproof camera, a viewing screen, and a waterproof cable connecting the camera and the screen. The camera may be a conventional video camcorder encased in a waterproof enclosure. The enclosure may further features ballasts, buoyancy devices, or hydrodynamic attachments. Additionally, the enclosure may be associated with one or more lights for increased visibility in low light conditions. Some underwater cameras may even be equipped with motorized devices for controlling the direction that the camera faces.

A typical underwater camera can be used in a variety of settings, including boats, docks, and frozen water surfaces. Generally, fishermen use such cameras to explore the underwater features as well as to spot and track fish in particular locations. When used from a boat or a dock, underwater cameras can generally be secured to the boat or dock surface, or allowed to freely float underwater. In ice fishing applications, the camera can usually not be secured to a stable surface due to absence of any gripping surface. Typically, a fisherman will drill one or more holes on the surface of a frozen body of water. The camera can then be lowered into the void in order to view the presence or absence of underwater life.

Despite their simplicity and ease of use, typical underwater cameras are associated with a plurality of problems. Strong underwater currents can carry the camera independently of user input. This may be undesirable, particularly when the user wishes to view a specific underwater area.

Another problem of existing devices is their inability to control the direction the camera is facing. Typically, underwater currents will impact the direction of the camera much like wind forces control the direction of a weathervane. This is particularly problematic if the user wishes to survey a particular underwater area in a specific direction.

A number of inventions have attempted to solve the inherent problems associated with underwater cameras. U.S. Pat. No. 6,909,845 to Schillinger teaches a camera line support device that is adapted for ice fishing. A cylindrical sleeve member having an inner and outer surface, and an open top is lowered into the fishing hole and secured therein. A protruding tab extends throughout the perimeter of the sleeve member and features a slot into which a camera cable can be secured. A stop on the cable line contacts with the slot in the sleeve member to suspend the camera at a particular depth. The device does not have a feature for controlling the angular orientation of the underwater camera.

U.S. Pat. No. 4,823,494 to Waterman comprises an insulated cover for the ice fishing hole to which a plurality of attachments can be connected. For instance, an alerting device featuring an actuating rod connected to an underwater bait line can alert the fisherman when the bait line is engaged. Additionally, the invention may support a camera, however, it is not capable of controlling its angular orientation.

U.S. Design Pat. D438,881 to Zernov teaches an underwater viewing monitor. A portable shield conceals the camera and monitor and enables the user to survey the underwater features immediately below the ice fishing hole. The disadvantage of the invention is its bulky construction as well as the inability to accurately control the angular orientation of the underwater camera.

While features taught in the prior art are incorporated into this invention, other elements are different enough so as to make the combination distinguished over the inventors own prior art. The prior art devices are incapable of providing a precise angular control the underwater camera. Accordingly, it is desirable to develop a new apparatus for underwater surveillance that overcomes the foregoing difficulties by providing an underwater camera base capable of precise angular adjustment of the camera with respect to the base. The present invention teaches a novel underwater camera support device which allows a precise angular adjustment of the underwater camera regardless of the underwater currents. The device comprises a camera support base comprising a circular rim enclosed by a top surface. The top surface rotatably supports an indexed wheel which may be rotated independent of the camera support base. A locking mechanism secures the indexed wheel in a desired orientation to precisely control its angular orientation with respect to the base. An underwater camera is attached to the indexed wheel such that its angular orientation corresponds to the angular orientation of the indexed wheel. Furthermore, the indexed wheel comprises a camera cable clamp which allows the user to precisely control the depth at which the camera is suspended.

SUMMARY OF THE INVENTION

Accordingly, the present invention is directed a new system for controlling the angular orientation of an underwater surveillance camera. In accordance with the preferred embodiment of the present invention, an ice fishing camera support device is disclosed herein.

It is an object of the present invention to provide an ice fishing camera support device that enables a precise angular control of the underwater camera orientation.

It is another object of the present invention to provide an ice fishing camera support device comprising a base consisting of a circular rim enclosed by a top surface.

It is a further object of the present invention to provide an ice fishing camera support device wherein the top surface comprises a recessed member that rotatably supports an indexed wheel which may be rotated independently of the base.

Yet another object of the present invention is to provide an ice fishing camera support device wherein the orientation of the indexed wheel can be locked with respect to the base such that its angular rotation with respect to the base may be precisely controlled.

Another object of the present invention is to provide an ice fishing camera support device that is easy to carry and install in an ice fishing hole.

An additional object of the present invention is to provide an ice fishing camera support device that is simple and economical to manufacture in mass quantities.

According to one aspect of the present invention, the ice fishing camera support device generally comprises a camera support base that rotatably supports an indexed wheel. The orientation of the indexed wheel with respect to the base allows a precise angular adjustment of the underwater camera regardless of the underwater currents. The camera support base generally comprises a circular rim enclosed by a top surface. The top surface rotatably supports an indexed wheel which may be rotated independent of the camera support base. A locking mechanism secures the indexed wheel in a desired orientation to precisely control its angular orientation with respect to the base. An underwater camera is attached to the indexed wheel such that its angular orientation corresponds to the angular orientation of the indexed wheel. Furthermore, the indexed wheel comprises a camera cable clamp which allows the user to precisely control the depth at which the camera is suspended.

Additional features and advantages of the invention will be set forth in the proceeding detailed disclosure and the accompanying figures. The above advantages and features are of representative embodiments only, and are presented only to assist in understanding the invention. It should be understood that they are not to be construed as limitations of the invention.

BRIEF DESCRIPTION OF THE DRAWINGS

The advantages and the features of the present invention will become better understood with reference to the following and the more detailed description and the claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures. The present invention presents a novel and useful an ice fishing camera support device comprising a rotatable and lockable indexed wheel supported on the top surface of a base that allows a precise angular adjustment of the wheel with respect to the base.

1. Detailed Description of the Figures

Figure 1:
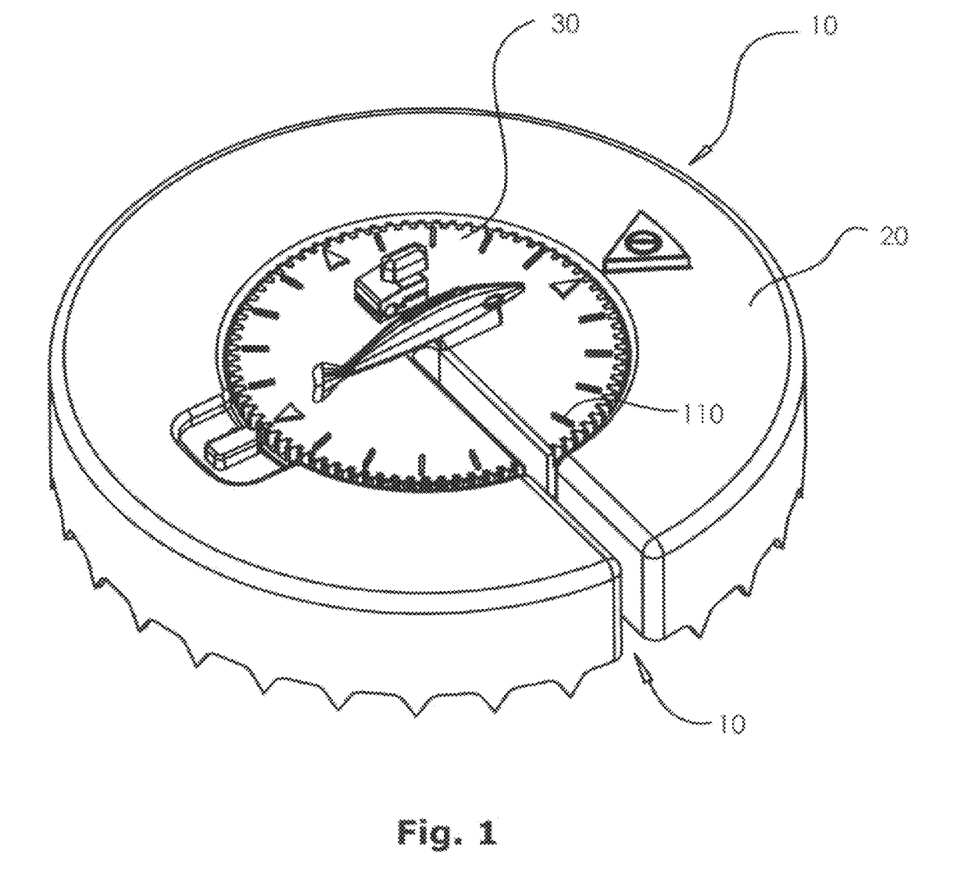
FIG. 1 is a perspective view of an ice fishing camera support device according to an example of the preferred embodiment of the present invention, shown in a front horizontal orientation.
Figure 2:
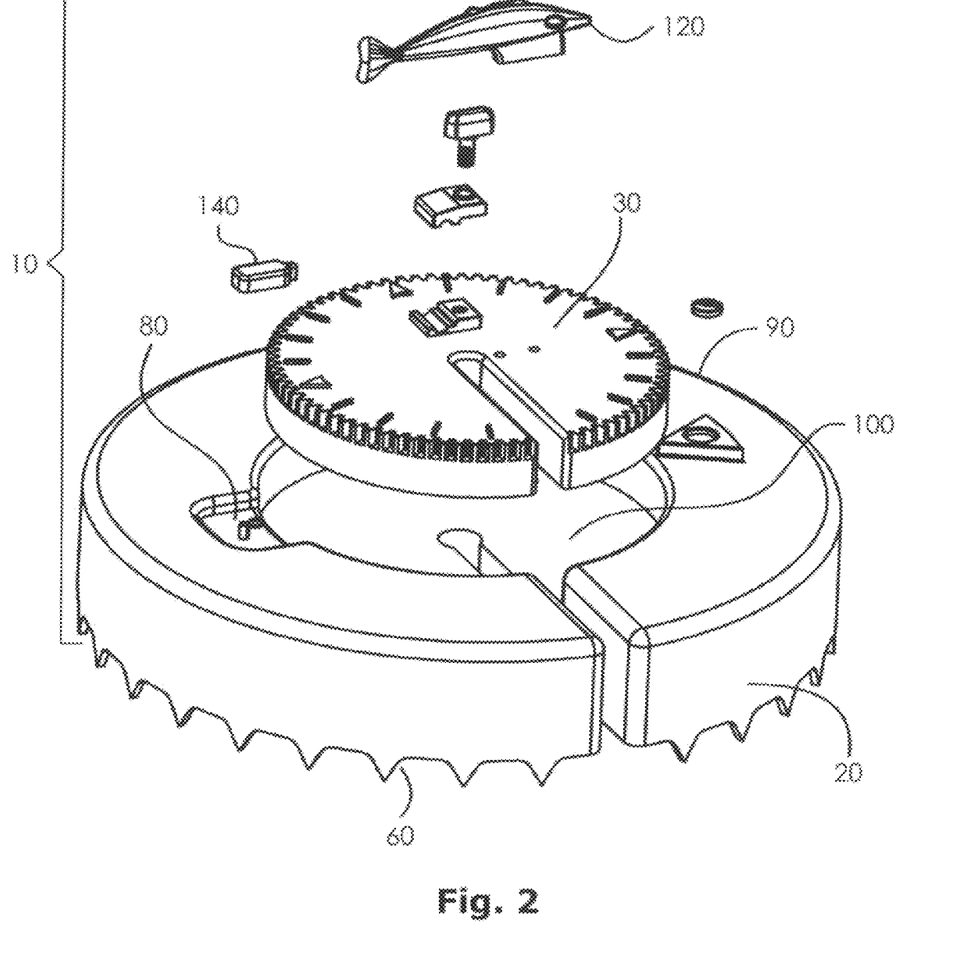
FIG. 2 is an exploded perspective view thereof.
Figure 3:
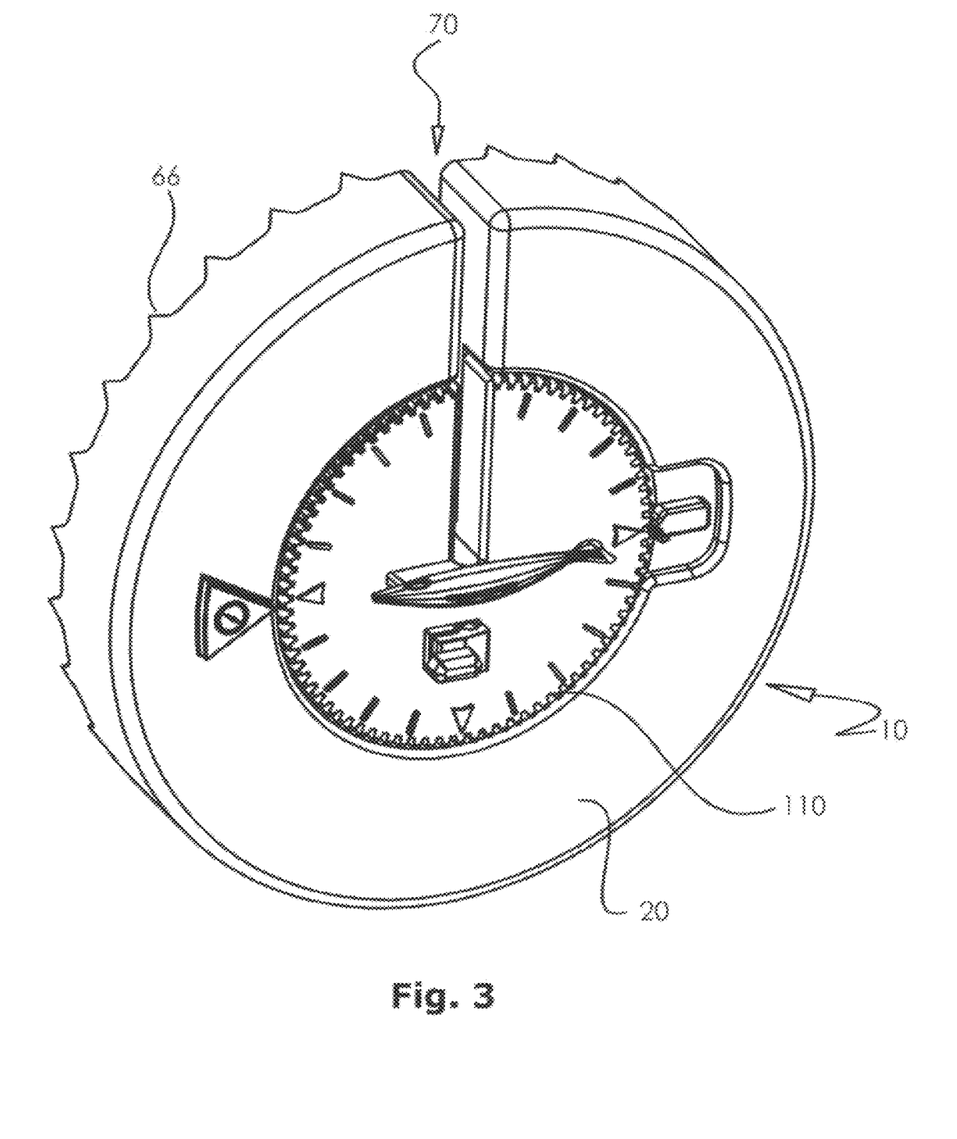
FIG. 3 is a perspective view thereof, shown in a front vertical orientation.
Figure 4:
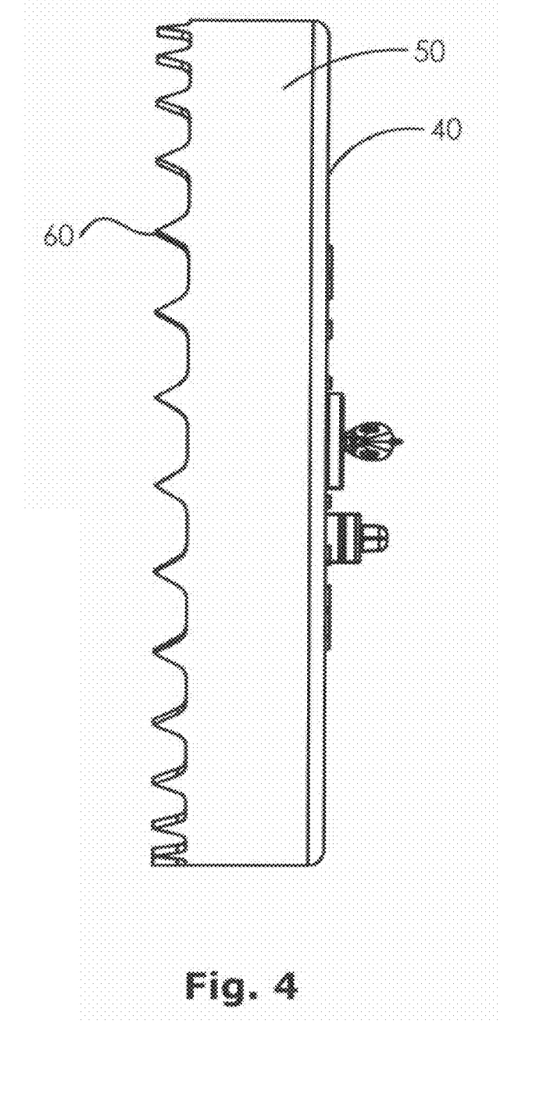
FIG. 4 is a left side elevational view thereof.
Figure 5:
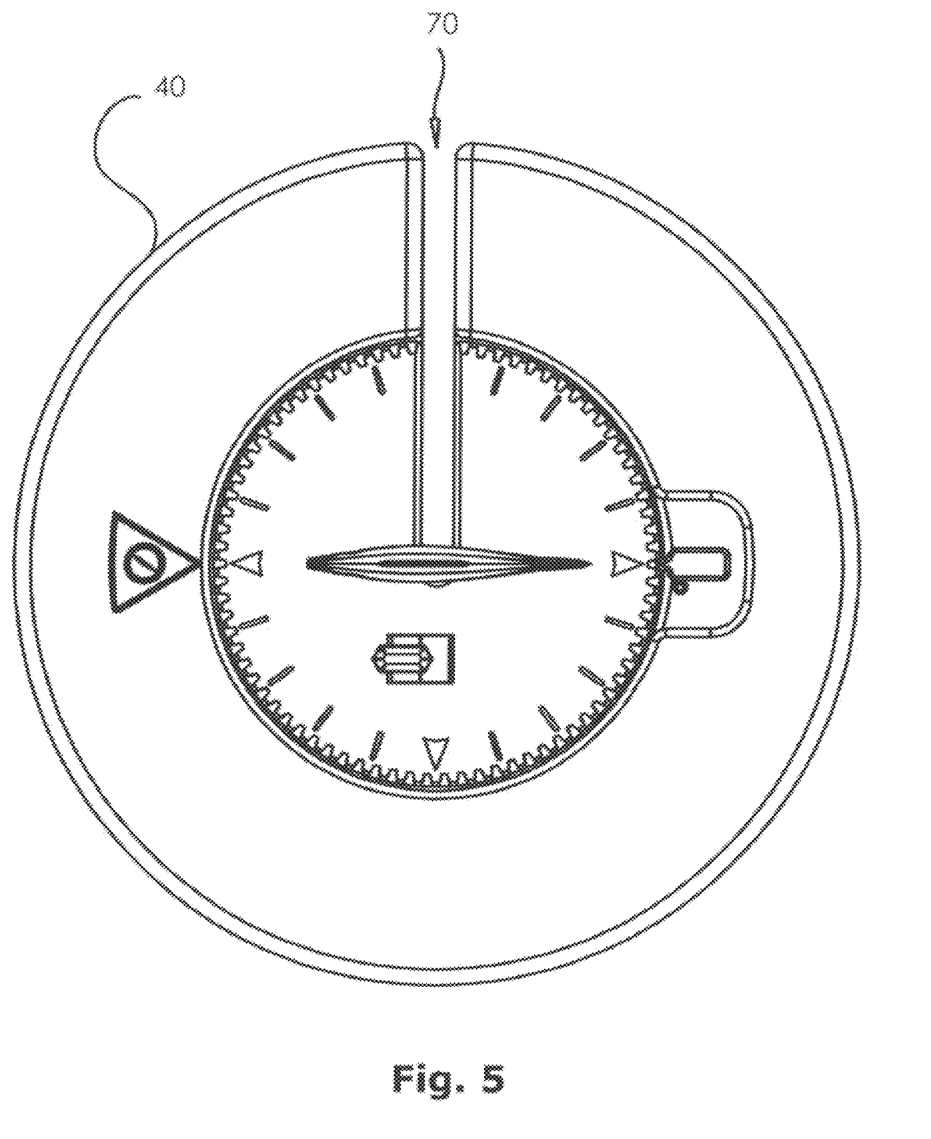
FIG. 5 is a top plan view thereof.
Figure 6:
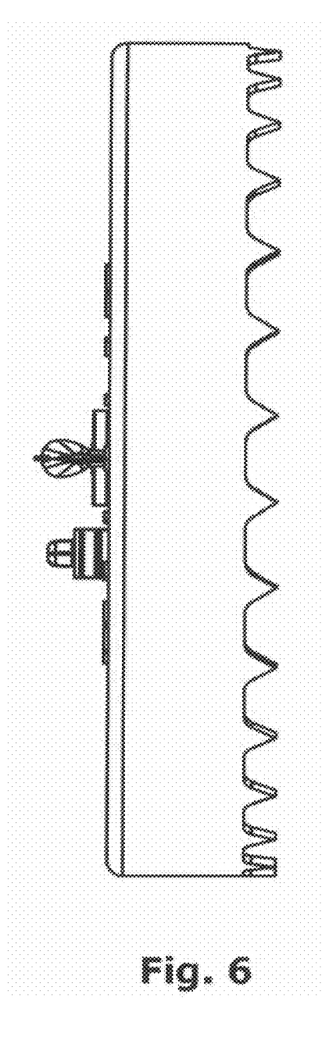
FIG. 6 is a right side elevational view thereof.
Figure 7:
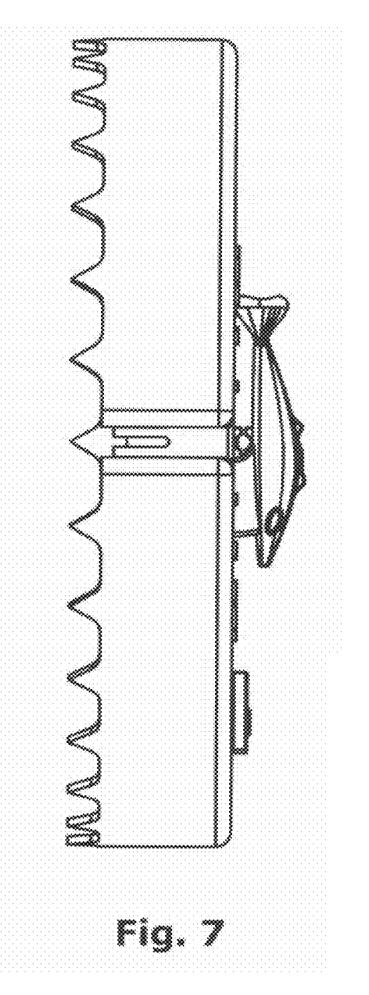
FIG. 7 is a top side elevational view thereof.
Figure 8:
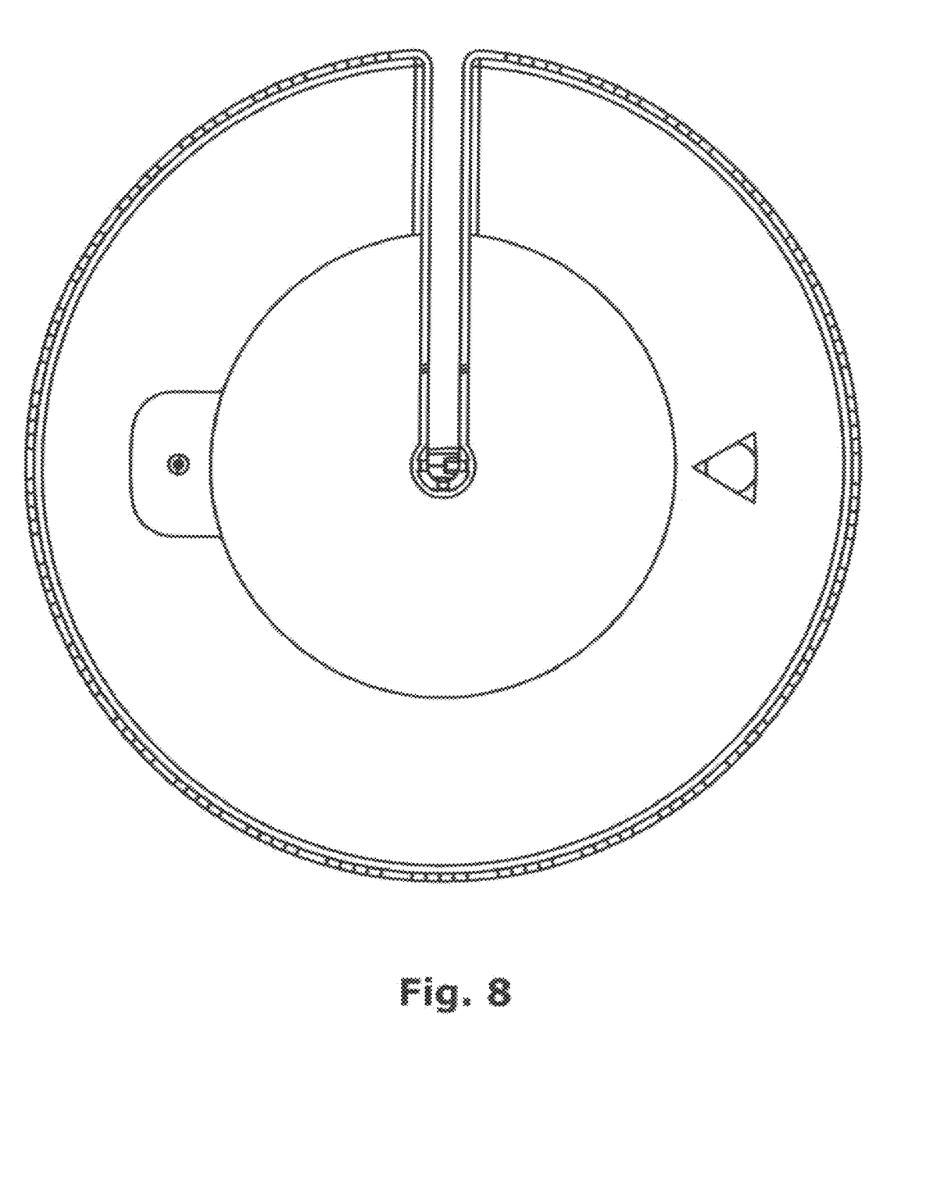
FIG. 8 is a bottom plan view thereof.

Examples of the preferred embodiments of the present invention are shown in the figures, but these examples do not limit the present invention to only those expressions shown. For the purposes of disclosure, an ice fishing camera support device 10 is depicted in FIGS. 1-8. The camera support device 10 generally comprises a support base portion 20 and a rotatable indexed wheel 30.

The support base 20 is preferably manufactured from plastic, metal or a similar material that offers sufficient strength and resiliency, yet is easy and economic to manufacture. Preferably, the support base is manufactured from a material that floats such that in case the ice surface is broken and the camera support device 10 is submerged, the base 20 will not sink.

The support base 20 generally comprises a circular top portion 40 and downward-protruding side wall 50 extending from the outer peripheral section of the top portion 40. A plurality of gripping teeth 60 extend from the bottom surface of the side wall 50. The gripping teeth 60 may be embedded into the ice surface to prevent the camera support device 10 from sliding on the ice surface. Although the figures illustrate the gripping teeth 60 extending along the entire bottom surface of the side wall 50, it is anticipated that they may also extend only through a portion of the bottom surface of the side wall.

The support base 20 further features a slot 70 which extends from the center of the top portion 40 radially outward. The slot 70 further extends through the side wall 50 such that it provides an unobstructed path from the outside of the support base 20 to its center. The support base 20 additionally comprises a recessed section 80 on the top portion 40. The recessed section 80 is substantially parallel to top portion 40 and is connected thereto via an integral sidewall.

The recessed section 80 rotatably supports an indexed wheel 90. The indexed wheel 90 is centrally supported within the recessed section 80 and may be freely rotated with respect to the support base 20. The indexed wheel 90 may be supported on a shaft, bearing, or any other device known in the art which would enable its free rotation within the recessed section 80.

The indexed wheel 90 features a plurality of indexing teeth 100 on its peripheral edge. The indexing teeth 100 are spaced at predetermined angular intervals which allow a precise determination of the angular orientation of the indexed wheel 90 with respect to the support base 20. The indexed wheel may further feature a plurality of indicia 110 on its top surface which correspondingly indicate the angular intervals of the indexing teeth 100. Additionally, the indexed wheel may comprise a handle portion 120 that enables the user to easily rotate the indexed wheel 90 with respect to the support base 20.

The indexed wheel 90 additionally composes a slotted section 130 extending from its center radially outward to its peripheral edge. The width of the slotted section 130 corresponds to the width of the slot 70 located on the support base 20. In order to prevent the indexed wheel 90 from freely rotating about the support base 20, a locking mechanism 140 is provided. The locking mechanism 140 may be a lever-type device which features a protrusion which can interface with any of the plurality of indexing teeth 100. Thus, when the protrusion interfaces with any individual tooth, the indexed wheel 90 is in a locked position and cannot be rotated with respect to the support base 20.

2. Operation of the Preferred Embodiment

The indexed wheel 90 allows for independent adjustment its angular orientation with respect to the support base 20. Since the support base 20 is preferably secured to the ice surface via the gripping teeth 40, the orientation angular orientation of the wheel 90 can be precisely controlled. The underwater camera 160 is preferably supported on a shaft 170. Before the underwater camera can be installed to the camera support device 10, the slotted section 130 on the indexed wheel is aligned with the slot 70 on the support base such that they are in a parallel orientation with respect to each other. The shaft 170 then may be inserted into the slot 70 and secured in the center portion of the indexed wheel 90. Once the shaft 170 is inserted, the indexed wheel 90 may be rotated to direct the camera in a desired direction. Alternately, the camera cable may be directly inserted into the slot 70 without securing the camera to the shaft 170.

The foregoing descriptions of specific embodiments of the present invention are presented for purposes of illustration and description. They are neither intended to be exhaustive nor to limit the invention to the precise forms disclosed and, obviously, many modifications and variations are possible in light of the above teaching. By way of example, and not as a limitation, it is envisioned that the top surface of the indexed wheel 90 can further comprise a camera cable clamp which enables a secure locking of the camera cable. The support base can then be utilized to suspend an underwater camera and the depth at which the camera is suspended is determined by the length of cable leading from the camera to the cable clamp.

Furthermore, the indexed wheel may comprise a compass. The indicia 110 and the compass allow the user to adjust the camera support device 10 both with respect to the angular orientation to the support base 20 as well as the earth's magnetic poles. The compass is preferably glued to the top surface of the indexed wheel. Alternatively, the compass may be positioned on the support base 20. Having a compass on the camera support device 10 can be particularly useful in surveying different underwater areas with respect to different direction relative to the earth's magnetic field.

The embodiments are chosen and described in order to best explain the principles of the invention and its practical application, to thereby enable others skilled in the art to best utilize the invention and its various embodiments with modifications as are suited to the particular use contemplated. It is intended that a scope of the invention be defined by the Claims appended hereto and to their equivalents.

The invention claimed is:

1. An ice fishing underwater camera support device comprising:
    a circular top first portion;
    a downward-protruding side wall extending from the outer peripheral section of said lop first portion;
    a plurality of gripping teeth extending from the bottom surface of said downward-protruding sidewall, where said gripping teeth embedded into ice to prevent said camera support device from slipping of the ice;
    an indexed wheel second portion having a top and bottom surface and a peripheral edge;
wherein said indexed second portion wheel is rotatably supported on said circular top first portion such that it may independently rotate with respect to said circular top first portion.

2. An ice fishing underwater camera support device according to claim 1, further comprising a plurality of indexing teeth on said peripheral edge of said indexed wheel second portion, wherein said teeth are spaced at predetermined angular intervals which allow a precise angular orientation of said indexed wheel with respect to said circular top first portion.

3. An ice fishing underwater camera support device according to claim 2, further comprising a handle located on said top surface of said indexed wheel second portion, wherein said handle enables for rotation of said indexed wheel second portion to set a predetermined angular interval which allows a precise angular orientation of said indexed wheel second portion, with respect to said circular top first portion.

4. An ice fishing underwater camera support device according to claim 2, further comprising a plurality of indicia located on said top surface of said indexed wheel second portion, wherein said plurality of indicia enable determination of precise angular orientation of said indexed wheel second portion with respect to said circular top first portion.

5. An ice fishing underwater camera support device according to claim 2, wherein said indexed wheel second portion further comprises a compass to determine its orientation with respect to the earth's magnetic poles.

6. An ice fishing underwater camera support device according to claim 1, further comprising a slot on said circular top first portion, wherein said slot extends radially outward from the center of said circular first portion to its peripheral edge and through said side wall.

7. An ice fishing underwater camera support device according to claim 1, further comprising a handle located on said top surface of said indexed wheel second portion, wherein said handle enables for rotation of said indexed wheel second portion to set a predetermined angular interval which allows a precise angular orientation of said indexed wheel second portion with respect to said circular top first portion.

8. An ice fishing underwater camera support device according to claim 1, further comprising a slotted portion on said indexed wheel second portion, wherein said slotted portion extends radially outward from the center of said indexed wheel second portion through its peripheral edge.

9. An ice fishing underwater camera support device according to claim 1, further comprising a cable clamp located on said top surface of said indexed wheel second portion, wherein said cable clamp enables the cable of an underwater camera to be securely clamped to said indexed wheel second portion.

* * * * *